United States Patent [19]
Kobayashi et al.

[11] Patent Number: 4,649,005
[45] Date of Patent: Mar. 10, 1987

[54] METHOD FOR PRODUCING A LIQUID SILICONE RUBBER BASE

[75] Inventors: Masaru Kobayashi; Hironobu Koyanagi; Takahiro Sato, all of Chiba, Japan

[73] Assignee: Toray Silicone Co., Ltd., Tokyo, Japan

[21] Appl. No.: 754,492

[22] Filed: Jul. 12, 1985

[30] Foreign Application Priority Data

Jul. 31, 1984 [JP] Japan ................. 59-160398

[51] Int. Cl.⁴ .................... B29B 7/48; B29B 7/84
[52] U.S. Cl. ................... 264/101; 264/102; 264/349; 264/176.1; 425/203; 425/204; 524/266; 524/860
[58] Field of Search .......... 264/102, 101, 349, 176 R, 264/331.11, 236, 347; 425/203, 204; 524/266, 860

[56] References Cited

U.S. PATENT DOCUMENTS

| | | | |
|---|---|---|---|
| 3,960,802 | 6/1976 | Beers et al. | 264/349 |
| 4,032,502 | 6/1977 | Lee et al. | 264/328.6 |
| 4,061,704 | 12/1977 | Barter | 264/347 |
| 4,340,709 | 7/1982 | Jeram et al. | 264/331.11 |
| 4,442,060 | 4/1984 | Bouverot et al. | 264/328.6 |
| 4,528,156 | 7/1985 | Fukuda et al. | 264/347 |
| 4,528,324 | 7/1985 | Chung et al. | 264/102 |

*Primary Examiner*—Jeffery Thurlow
*Attorney, Agent, or Firm*—Robert Spector

[57] ABSTRACT

Filled silicone rubber bases can be prepared without plasticizer by passing all of the filler together with from 30 to 100 percent of the total weight of the polyorganosiloxane ingredient of the base through the first kneading section of a compounding extruder and adding my remaining polyorganosiloxane before passing the composition through a second kneading section of the compounding extruder. The two kneading sections are maintained at temperatures of from 200° to 300° C.

7 Claims, 2 Drawing Figures

METHOD FOR PRODUCING A LIQUID SILICONE RUBBER BASE

BACKGROUND OF THE INVENTION

1. Field of the Invention

This invention relates to the production of curable silicone rubber. More particularly, this invention relates to a method for producing liquid silicone rubber bases containing relatively large amounts of filler without the need for a plasticizer.

2. Description of the Prior Art

Silicone rubber moldings are conventionally produced by kneading a silicone rubber composition, which principally consists of a polyorganosiloxane gum and an inorganic filler such as reinforcing silica, together with an organic peroxide followed by crosslinking and curing during molding. This method requires a complicated process of softening or blending using a rubber mill prior to the molding step.

A method for molding liquid silicone rubber that avoids the foregoing complicated process has recently become widespread. The molding is produced by curing a liquid polyorganosiloxane having silicon-bonded vinyl groups and a relatively low degree of polymerization using a polyorganohydrogensiloxane in the presence of a platinum-containing catalyst. This method offers the advantages of simplifying the entire process because the composition is flowable before curing. The process is so simple that it can be applied to injection molding and can be automated.

However, liquid silicone rubber compositions suitable for molding must be flowable even though they contain large amounts of reinforcing fillers. For this reason, a plasticizer must be added such as hexamethyldisilazane, diphenylsilanediol, a cyclic polydimethylsiloxane or a polydimethylsiloxane exhibiting silanol or alkoxy terminal groups and a degree of polymerization of 20 or less. As a result, the complexity of the composition or process is increased and production costs become high.

An objective of the present invention is to eliminate the above-mentioned disadvantages by providing a method for producing a flowable liquid silicone rubber base using a simple process that does not require the addition of any plasticizer.

SUMMARY OF THE INVENTION

This invention provides a method for producing a filled liquid silicone rubber base in the absence of a plasticizer where said base consists essentially of a polyorganosiloxane having at least two silicon-bonded alkenyl groups per molecule and an inorganic filler, said method consisting essentially of passing all of said filler together with from 30 to 100 percent of the total weight of said polyorganosiloxane through a first kneading section of a twin screw compounding extruder to form a mixture, adding any remaining portion of said polyorganosiloxane to said mixture prior to passing it through a second kneading section of said extruder and discharging the resultant base from said extruder, where the temperatures of said first and second kneading sections are maintained at from 200° to 300° C.

DETAILED DESCRIPTION OF THE INVENTION

Figure 1:
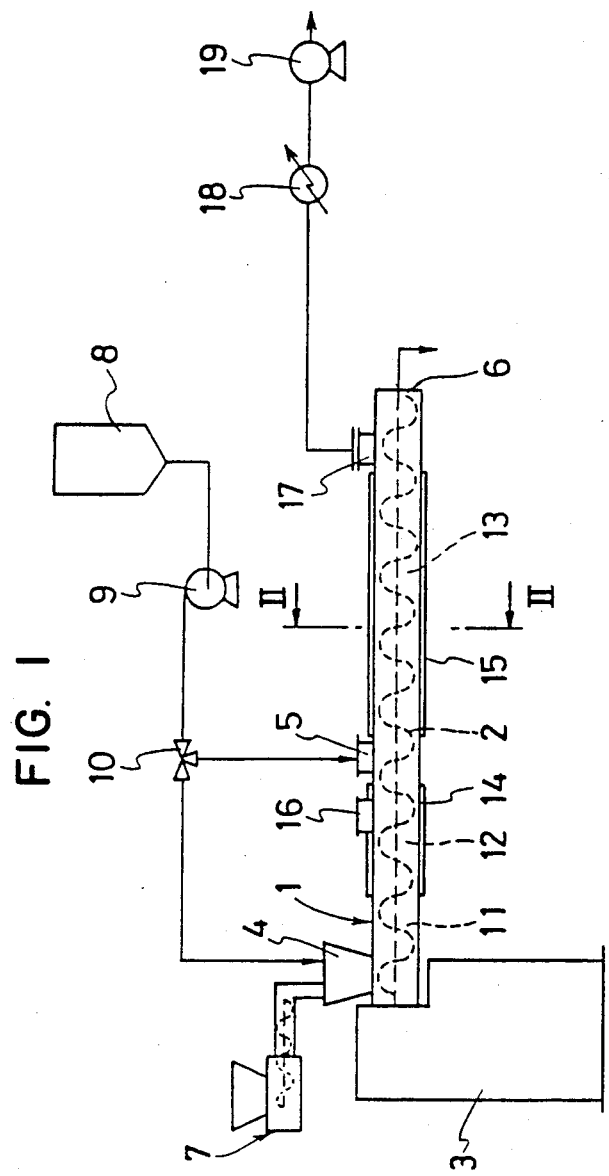
FIG. 1 is a diagrammatic view of a typical compounding extruder that is suitable for use in connection with the present method.

The polyorganosiloxane used in the present invention is the starting material for the liquid silicone rubber base and must contain at least 2 silicon-bonded alkenyl groups in each molecule. Examples of alkenyl groups are vinyl, allyl and 1-propenyl. Silicon-bonded groups other than alkenyl that can be present are monovalent and do not contain ethylenic unsaturation. Examples of suitable groups include, but are not limited to, alkyl such as methyl, ethyl, propyl and butyl; substituted alkyl such as 2-phenylmethyl, 2-phenylethyl and 3,3,3-trifluoropropyl and aryl such as phenyl and tolyl. Hydroxyl and alkoxy groups can also be present. The viscosity of the polyorganosiloxane must be from 0.3 to 30 Pa.s at 25° C.

The inorganic filler is used as reinforcement or as an extender for the liquid silicone rubber. Inorganic fillers to be employed include, but are not limited to, dry-process silica, wet-process silica, fine quartz powder, fumed titanium dioxide, diatomaceous earth, aluminum hydroxide, extremely fine alumina particles, colloidal calcium carbonate, colorants, and carbon black. These fillers can be used singly or in combinations of two or more.

The quantity of inorganic filler used is arbitrary and depends on the properties of the inorganic filler employed and on the desired tensile strength and hardness of the cured silicone rubber product. When the inorganic filler is extremely fine and strongly reinforcing such as dry-process silica, wet-process silica or carbon black, this quantity is preferably from 5 to 80 weight percent, based on the weight of polyorganosiloxane. When the inorganic filler is not very fine and has insignificant reinforcing capacity, such as fine quartz powder or diatomaceous earth, the weight of filler is preferably from 10 to 150 percent of the polyorganosiloxane weight.

Twin-screw compounding extruders of the type employed in the present method produce a flowable liquid silicone rubber base by blending the organopolysiloxane with the inorganic filler are commercially available. Twin-screw compounding extruders have 2 parallel rotary screws that simultaneously rotate in the same direction or opposite directions and are located in a barrel. The first supply inlet, through which all of the filler and at least a portion of the polyorganosiloxane are supplied, is located at the starting or upstream section of the extruder when considered longitudinally. This section is identified as 11 in FIG. 1. The second supply inlet through which any remaining portion of the polyorganosiloxane is added, is located between the two kneading sections.

The first supply inlet may be designed with individual inlets for polyorganosiloxane and inorganic filler. Alternatively, both materials can be supplied through a single inlet.

When the entire quantity of polyorganosiloxane is added through the first supply inlet, the second supply inlet need not be present.

The kneading section adjacent to the first supply inlet, referred to herein as the first kneading section, and the kneading section adjacent to the second supply inlet, referred to herein as the second kneading section, may be equipped with vent openings and at least the second kneading section must be equipped with a vent opening.

The two screws mentioned above may be single flight, double flight or triple flight screws and may be of the intermeshing or non-intermeshing type.

The present method for producing a liquid silicone rubber base without using a plasticizer can be summarized as follows. The first and second kneading sections of the extruder are heated to a temperature of from 200° to 300° C., inclusive in order to increase the flowability of the composition. Preferably, this temperature is from 250° to 280° C. All of the inorganic filler and from 30 to 100 percent of the total weight of the polyorganosiloxane are introduced through the first supply inlet into the first kneading section. Preferably the amount of polyorganosiloxane is from 50 to 100 percent, most preferably from 60 to 95 percent of the total weight of this material. Any remaining portion of polyorganosiloxane is added through the second supply inlet located between the first and second kneading sections of the compounding extruder.

Figure 2:
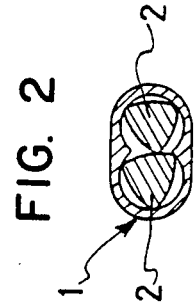
FIG. 2 is a cross-sectional view of the extruder taken along line II—II of FIG. 1.

FIGS. 1 and 2 are diagrammatic and cross-section views, respectively, of a typical compounding extruder suitable for use in connection with the present method.

In the figures, the barrel 1 contains two single, double or triple flight screws 2 and 2, installed in parallel and simultaneously rotated in the same or opposite directions by drive unit 3. The first supply inlet 4 is located closest to the drive unit in the upstream section of barrel 1; the second supply inlet 5 located in an intermediate section along the barrel and discharge outlet 6, through which the kneaded material is discharged, is located at the downstream end of the barrel.

A screw-type continuous feeder 7 continuously charges the inorganic filler into first supply inlet 4. The continuous feeder 7 can be a belt-type instead of a screw-type. Polyorganosiloxane is removed from storage tank 8 using pump 9 and then divided into two streams in the prescribed ratios using branching valve 10. One stream is supplied to first supply inlet 4 while the other stream is supplied to second supply inlet 5. Alternatively, the distribution of liquid polyorganosiloxane between first supply inlet 4 and second supply inlet 5 can be accomplished using two pumps wherein the discharge quantity of each pump is controlled to achieve the prescribed ratio.

The sections 11 of screws 2 located adjacent to and downstream from first supply inlet 4 are transport sections which transport the polyorganosiloxane and filler. Kneading sections 12 and 13, which principally conduct kneading, are adjacent to transport section 11. Kneading sections 12 and 13 are equipped with heating devices 14 and 15, respectively, such as electric heaters, which are designed to heat the kneading sections to temperatures of from 200° to 300° C., inclusive. An open vent 16 is installed at the lower or downstream end of first kneading zone 12 and vent 17 is installed at the downstream end of second kneading zone 13. Vent 17 is connected to vacuum pump 19 via condenser 18. Vacuum pump 19 removes water vapor from the interior of the compounding extruder. The first vent 16 is optional because the second supply inlet 5 can be simultaneously used as a vent.

Silicone rubber bases prepared using the present method can be combined with a polyorganohydrogensiloxane and a platinum-type catalyst and then cured at elevated temperatures to produce a silicone elastomer. At this point, addition-reaction retarders, thermal stabilizers, and colorants can be added if required. The final compositions can be molded by various methods such as compression molding, injection molding and transfer molding.

This invention will be further explained using the following examples which are not intended to limit the scope of the accompanying claims. All parts and percentages are by weight and viscosities were measured at 25° C. Hardness of the cured rubber was determined using ASTM test method D-2240.

EXAMPLES 1-5

Wet-process silica ($W_F$ parts) exhibiting a specific surface area of 230 m$^2$/g and a vinyl-terminated polydimethylsiloxane ($W_1$ parts) exhibiting a vinyl group content of 0.23% and a viscosity of 4 Pa.s were both continuously supplied to the first supply inlet located from 3 to 18 cm. from the upstream end of a twin-screw compounding extruder equipped with co-rotating triple flight screws measuring 3 cm in diameter and 129 mm in length. An open vent was located from 51 to 57 cm. from the upstream end and a second supply inlet was located from 69 to 78 cm. from the upstream end. $W_2$ parts of the aforementioned polydimethylsiloxane were supplied to this second supply inlet. A vacuum pump was connected to the vent hole located from 117 to 123 cm from the upstream end for degassing. The kneaded material was discharged from an outlet located 129 cm from the upstream end. The residence time of the wet-process silica was 36 seconds. The first 24 cm of the upstream end of the extruder was cooled to maintain the temperature at 70° C. or below. The sections located from 24 to 39 cm and from 114 to 129 cm from the upstream end were heated to a temperature of 150° C. The remaining sections of the barrel were heated to the temperature specified as "kneading temperature" in the following Table 1. This table also reports the composition of the various bases, their flowability and the properties of the cured rubber. Flowability is rated using the following scale:

⊙ : flows without the application of force
O: thixotropic but flows satisfactorily in extruder
X: does not flow in extruder.

100 parts of each liquid silicone rubber base were combined with 2 parts of a polymethylhydrogensiloxane exhibiting a viscosity of 0.007 Pa.s and containing 0.75 percent of silicon-bonded hydrogen and an amount of chloroplatinic acid-methylvinylsiloxane complex equivalent to 15 ppm of platinum relative to the polydimethylsiloxane. The compositions were then cured at 150° C. for 2 minutes. The properties of the cured rubber were measured and are reported in Table 1.

COMPARISON EXAMPLES 1 and 2

Liquid silicone rubber bases were produced from the vinyl group-containing polydimethylsiloxane and wet-process silica of Example 1 using the same compounding extruder, with the exception that the kneading zones were heated to 170° C. The processing conditions and results are reported in Table 1.

EXAMPLE 6

A liquid silicone rubber base was produced using the vinyl group-containing polydimethylsiloxane of Example 1, a dry-process silica exhibiting a specific surface area of 200 m²/g and the compounding extruder described in Example 1. The resultant liquid silicone rubber base was cured into a rubbery elastomer using the method of Example 1. The processing conditions for the base and properties of the elastomer are reported in Table 1.

EXAMPLE 7

A liquid silicone rubber base was produced and cured using the vinyl group-containing polydimethylsiloxane of Example 1 and a 3:2 weight ratio mixture of wet-process silica and diatomaceous earth using the compounding extruder of Example 1. The processing conditions and cured rubber properties are reported in Table 1.

ber base was combined with the methylhydrogenpolysiloxane and platinum catalyst described in Example 1 and then cured at an elevated temperature. The properties of the resulting rubber were similar to the properties listed in Table 1 for Examples 1, 2 and 3.

That which is claimed is:

1. A method for producing a filled liquid silicone rubber base in the absence of a plasticizer where said base consists essentially of a polyorganosiloxane having at least two silicon-bonded alkenyl groups per molecule and an inorganic filler, said method consisting essentially of passing all of said filler together with from 30 to 100 percent of the total weight of said polyorganosiloxane through a first kneading section of a twin screw compounding extruder to form a mixture, adding any remaining portion of said polyorganosiloxane to said mixture prior to passing it through a second kneading section of said extruder and discharging the resultant base from said extruder, where the temperatures of said first and second kneading sections are maintained at from 200° to 300° C.

2. A method according to claim 1 where said alkenyl groups are vinyl.

3. A method according to claim 1 where the silicon-bonded organic groups other than alkenyl that are present in said polyorganosiloxane are individually selected from the group consisting of methyl, phenyl and 3,3,3-trifluoropropyl.

4. A method according to claim 3 where said polyorganosiloxane is a vinyl-terminated polydimethylsiloxane.

5. A method according to claim 1 where the viscosity of said polyorganosiloxane is from 0.3 to 30 Pa.s 6. A method according to claim 1 where said inorganic filler is a silica or a mixture of silica and diatomaceous earth.

7. A method according to claim 1 where said first and second kneading sections are maintained at temperatures of from 200° to 280° C.

TABLE 1

| | Filler | Filler Quantity (parts) $W_F$ | Vinyl-group Containing Dimethylpolysiloxane (parts) | | Kneading Temperature T (°C.) | Flow-ability | Properties of Cured Rubber | | | |
|---|---|---|---|---|---|---|---|---|---|---|
| | | | $W_1$ | $W_2$ | | | Hardness Shore A | Tensile Strength MPa | Elongation (%) | Tear Strength N. cm |
| Example 1 | Wet-process Silica | 40 | 70 | 30 | 280 | ⊚ | 53 | 7.6 | 300 | 93.2 |
| Example 2 | Wet-process Silica | 35 | 70 | 30 | 250 | O | 53 | 6.1 | 294 | 96.1 |
| Example 3 | Wet-process Silica | 40 | 80 | 20 | 280 | O | 57 | 6.3 | 255 | 103.0 |
| Example 4 | Wet-process Silica | 35 | 100 | 0 | 280 | O | 65 | 6.8 | 265 | 117.7 |
| Example 5 | Wet-process Silica | 40 | 70 | 30 | 200 | O | 56 | 7.6 | 292 | 112.8 |
| Example 6 | Dry-process Silica | 25 | 70 | 30 | 280 | O | 48 | 5.6 | 297 | 83.4 |
| Example 7 | Wet- process Silica + Diatomaceous Earth | 55 | 70 | 30 | 280 | ⊚ | 51 | 5.7 | 249 | 83.4 |
| Comparison Example 1 | Wet-process Silica | 35 | 100 | 0 | 170 | X | | | | |
| Comparison Example 2 | Wet-process Silica | 35 | 70 | 30 | 170 | X | | | | |

COMPARISON EXAMPLE 3

100 parts of the polydimethylsiloxane of Example 1 were placed in a batch kneader in which the 2 blades exhibited planetary motion. 40 parts of wet-process silica were gradually added with mixing, after which the mixture was heated to 200° C. A flowable liquid silicone rubber base could not be produced using this procedure.

REFERENCE EXAMPLE 1

100 parts of the vinyl group-containing polydimethylsiloxane of Example 1 was placed in the batch kneader of Comparison Example 3 together with 6 parts hexamethyldisilazane and 2 parts water as a plasticizer. After mixing for 5 minutes, 40 parts of wet-process silica were gradually added and the resultant mixture heated at 170° C. with mixing for one hour. The interior of the kneader was then evacuated to remove the ammonia gas by-product. The resultant fluid silicone rub-